Nov. 11, 1941.                    W. T. TABB                    2,262,151
                    FUEL CONTROL SYSTEM FOR DIESEL ENGINES
                    Original Filed March 2, 1936        2 Sheets-Sheet 1
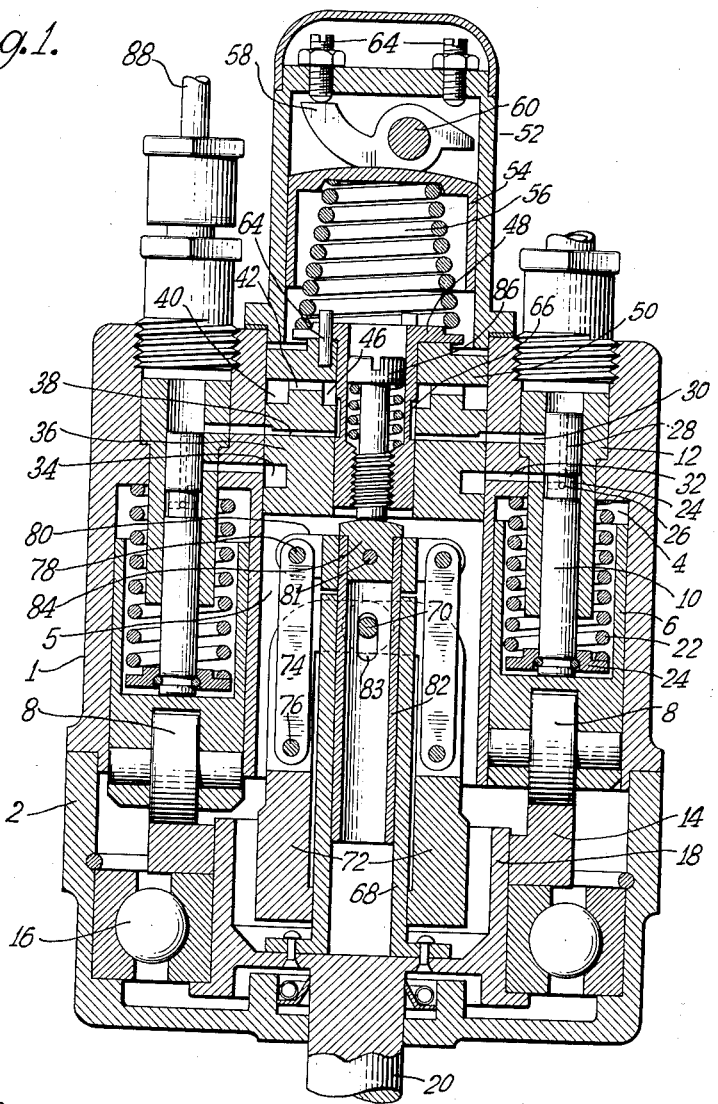
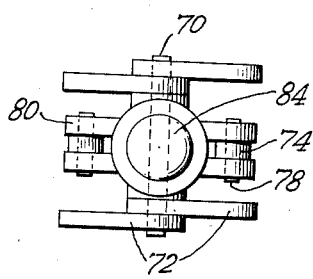
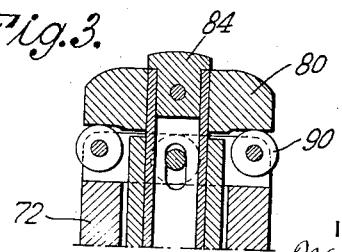
INVENTOR
Warner T. Tabb
BY
Watson, Bristol, Johnson & Leavenworth
ATTORNEYS Nov. 11, 1941. W. T. TABB 2,262,151
FUEL CONTROL SYSTEM FOR DIESEL ENGINES
Original Filed March 2, 1936 2 Sheets-Sheet 2

INVENTOR
Warner T. Tabb
BY
Watson, Bristol, Johnson & Leavenworth
ATTORNEYS

Patented Nov. 11, 1941

2,262,151

UNITED STATES PATENT OFFICE 2,262,151

FUEL CONTROL SYSTEM FOR DIESEL ENGINES

Warner T. Tabb, Brooklyn, N. Y., assignor to Eisemann Magneto Corporation, Brooklyn, N. Y., a corporation of New York Continuation of application Serial No. 66,711, March 2, 1936. This application February 12, 1941, Serial No. 378,505

3 Claims. (Cl. 123—140)

This invention relates to means for controlling the speed of internal combustion engines and more particularly to means for governing the speed of Diesel engines by controlling the supply of fuel thereto, and it is an object of this invention to provide a speed responsive means for regulating the supply of fuel delivered to the engine cylinders by the fuel pump so as to maintain a predetermined uniform speed of the engine, and it is a further object of this invention to provide a device of the kind described wherein the speed responsive means is assembled within the casing of the fuel pump to produce an efficient and reliable unit wherein the speed responsive means is protected from tampering or injury by the pump casing and a separate drive for the speed responsive means and linkage for operating the controlling valve or other means from the speed responsive means are eliminated.

Other objects of the invention will in part be obvious and will in part appear hereinafter.

This application is a continuing or substitute application for my original application, Serial No. 66,711, filed March 2, 1936.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 1 is a central vertical sectional view of a device constructed in accordance with this invention;

Fig. 2 is a fragmentary view showing in plan the arrangement of the weights and links of the speed responsive means of Fig. 1;

Figs. 3 and 4 are fragmentary vertical sectional views of modifications of the means operated by the weights of the speed responsive means;

Figure 4:
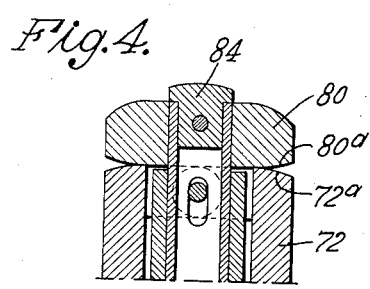

In Fig. 1 of the drawings this invention is shown applied to a fuel pump for Diesel engines, such as is shown in U. S. Patent No. 2,166,876, issued July 18, 1939 in the name of E. M. Purdy. Such a fuel pump comprises a casing consisting of an upper portion 1 and a lower portion 2, the upper portion being provided with a plurality of plunger chambers 4 symmetrically arranged about a bore or chamber 5 on the longitudinal axis of the casing, the chambers 4 having therein the followers 6 carrying the rollers 8 and engaging pump plungers 10 which are mounted for reciprocation in sleeves 12 fixed in the chambers 4. The followers 6 are operated in one direction by a cam 14 rotatably mounted in the lower portion 2 on ball-bearings 16 and driven by a flanged head 18 secured to a drive shaft 20 which is driven in synchronism with the motor from any suitable rotating part thereof. A spring 22, confined between the casing portion 1 and a washer 24, fixed on the plunger 10, holds each plunger 10 in engagement with the follower 6 and serves to retract the plunger and follower after passage of the cam 14. Each plunger 10 is grooved, as at 24, intermediate its length and is provided with a transverse passage or port 26 at the groove 24 and which communicates with a longitudinally extending centrally located passage 28 which extends to the upper face of the pump plunger 10. Communicating with the bore of the sleeve 12 in which each pump plunger 10 reciprocates is a port or passage 30 in the casing portion 1 through which the fuel is supplied to the bore of the sleeve and a passage 32 which connects the bore of the sleeve with an annular passage 34 in a valve body or bushing 36 press-fitted in the central chamber 5, which passage 34 communicates with the fuel supply for the pump through a passage (not shown) in the casing portion 1. The valve body 36 is also provided with ports 38 which communicate with the ports 30 in the casing portion 1 and with an annular passage 40 which communicates with the source of fuel supply and is connected by passages 42 to annular groove or passage 46. The ports 38 and the annular groove 46 are arranged to be connected by an annular groove 66 in a valve or member 48 which may be cylindrical and slidably mounted in a central bore of the valve body 36.

The upper portion 50 of the valve body 36 is engaged by a housing 52 secured to the casing portion 1 in any suitable manner and in the housing 52 there is slidably mounted a spring follower 54 which bears upon a spring 56 to exert pressure upon the upper end of the valve 48. A cam 58, mounted on shaft 60 journaled in the housing 52, serves to adjust the pressure applied to the valve 48, the shaft being operated and held in adjusted position by any suitable means fixed to the end thereof. Stops 62 adjustably mounted in the upper end of the housing 52 serve to limit the movement of the cam 58 in both directions. A pin 64 mounted in the upper portion 50 of the valve body 36 and engaging in an opening in the head of the valve 48 prevents rotation of the valve.

To the head 18, driven by the shaft 20, there is secured a sleeve 68 at the upper end of which there is fixed a pin 70 on which are pivotally mounted the upper ends of weights 72 of a speed responsive means, the upper portions of the weights 72 being slotted to form arms which pass to opposite sides of the sleeve 68 to engage the ends of the pin 70. Links 74 lie in the slots in the weights 72 and are connected at their lower ends by pins 76 to the weights 72 and at their upper ends by pins 78 to a head 80 secured by pin 81 to a sleeve 82 slidable in the sleeve 68 and slotted, as at 83, for the passage of the pin 70 on which the weights 72 are mounted. Fixed in the upper end of the sleeve 82 is a plug 84 having a curved upper surface which engages with the lower end of a screw 86 threaded in the lower end of the valve 48 and adjustable so as to vary the position of the valve and the annular groove 66 with respect to the ports 38.

As in the construction schown in the Purdy patent above referred to, reciprocation of the pump plungers 10 by the rotation of the cam 14 causes the fuel to be drawn into the bore of the sleeve 12 and forced therefrom past the usual check valve and out through the pipes 88 to the engine cylinders, the fuel being supplied from the source of supply through the annular recess or passage 40, passages 42 to the annular passage 46 and thence through the annular groove 66, passages 38 and ports 30 to the bores of the sleeves 12. Movement of the plunger 10 forces the fuel through the pipe 88 to the engine cylinder until movement of the pump plunger causes the groove 24 on the pump plunger to establish connection with the port 32, whereupon the pressure is vented from above the pump plunger through the longitudinal passage 28, transverse passage 26 to the grooved portion of the pump plunger and through port 32 and annular passage 34 to the supply, cutting off the passage through the pipe 88 to the engine cylinders. The amount of fuel supplied to the bore of the sleeve 12 each time a pump plunger 10 is retracted will depend upon the extent of the opening of the ports 38 to the annular groove 66. With the engine at rest and the speed responsive means not operating, as shown in Fig. 1, the groove 66 establishes full opening with the ports 38 but upon operation of the engine at a speed at which centrifugal force acting upon the weights 72 overcomes the resistance of the spring 56, the valve 48 will be raised against the action of the spring 56 and the communication with ports 38 will be cut off to a greater or less extent, thereby varying the amount of fuel supplied to the bore of the sleeve 12 in accordance with the engine speed to maintain the desired speed of the engine. The engine speed at which the speed responsive means operates may be varied by operating the shaft 60 and the cam 58 to vary the compression of the spring 56 and in this manner vary the resistance of the valve 48 to operation by the governor weights.

In the modification shown in Fig. 3, in place of having the head 80 connected to the governor weights 72 by links, the governor weights 72 are recessed at their upper ends and provided with balls or rollers 90 which bear against the under face of the head 80 to operate the head 80 in the same manner as do the links of Fig. 1, or in place of using rollers 90, as shown in Fig. 3, the upper ends of the weights 72 and the lower face of the head 80 may be suitably shaped to provide camming surfaces 72$^a$ and 80$^a$ which will cooperate to raise the head 80 as the weights 72 are moved outwardly as shown in Fig. 4.

Figure 5:
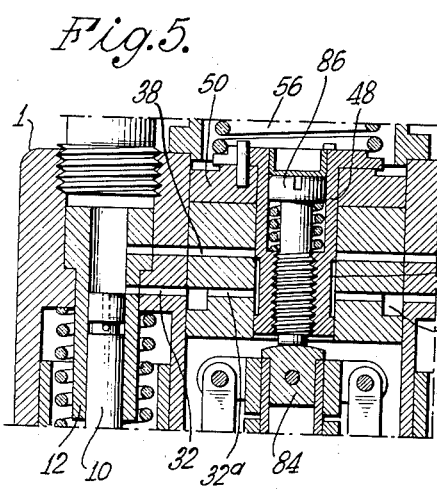
Fig. 5 is a fragmentary view similar to Fig. 1 and showing the application of the speed responsive means to a fuel pump of modified construction.

In the construction shown in Fig. 1 the fuel is drawn into the bore of the sleeve 12 by a partial vacuum created by the retraction of the pump plunger and the amount of fuel thus drawn in is controlled by the valve 48, but the invention is not limited to such a construction and, as shown in Fig. 5, it may be used in a construction where the fuel is supplied from an annular recess 34$^a$, which is in communication with the source of fuel supply, through the port 32 to the bore of the sleeve 12 when the pump plunger 10 is in its lowered position and a vent from the chamber above the pump plunger is controlled through passage 38 and annular groove 66 in the valve 48 as the pump plunger is moved upwardly, the groove 66 establishing communication from the passage 38 to passage 32$^a$ and thence to the annular passage 34$^a$ in communication with the source of fuel supply. In this case, as in Fig. 1, the valve 48 is operated by a speed responsive means to establish communication through the groove 66 to a greater or less extent between the passages 38 and 32$^a$ in accordance with the speed of the engine, permitting, in this case, a greater or less venting of the fluid from in front of the pump plunger 10 as the pump plunger is raised to force the fluid to the engine cylinder in the usual manner and controlling the amount of fuel supplied to the engine cylinders.

Figure 7:
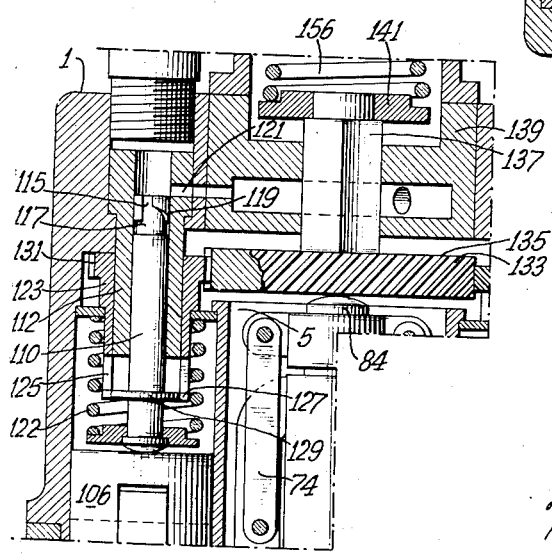

The invention is also applicable to fuel pumps of other types, such for instance as that shown in U. S. Patent to Baur, No. 1,944,858, dated January 23, 1934, in which the control of the volume of fuel supplied to the engine cylinders by the pump plungers is by rotation of the pump plungers. In such a construction, as shown in Fig. 7, the pump plunger 110 is mounted in a sleeve 112 and reciprocated in the usual manner by a cam operated follower 106 and a spring 122. The pump plunger at its upper end is provided with a port 115 which communicates with a recess 117 in the face of the plunger having a helical upper wall 119 so positioned that by rotation of the pump plunger 110 communication through the recess 117 and port 115 from the bore of the sleeve 112 above the pump plunger to port 121 can be established at different points in the upward movement of the pump plunger 110.

To rotate the pump plunger 110 there is provided a sleeve 123 rotatably mounted on the outer face of the sleeve 112 and slotted at its lower end, as at 125, to receive lugs 127 on a collar 129 fixed on the pump plunger 110. The sleeve 123 is provided with spiral gear teeth 131 which mesh with the similar teeth 133 on a gear 135 engaged on its lower side by the plug 84 of a speed responsive means, such as is shown in Fig. 1, and having projecting from its other face a stem 137 which extends through a plug 139 fixed in the upper end of the bore or chamber 5 of the casing portion 1, the stem 137 and the opening in the plug 139 being of such shape as to prevent rotation of the gear 135. The upper end of the stem 137 is fitted with a washer 141 upon which is seated a spring 156 which may be adjusted, as in Fig. 1, to vary the pressure exerted upon the washer by the spring and in this way vary the engine speed at which the speed responsive means operates the gear 135. The raising and lowering of the gear 135, through the connection of the teeth 133 thereon with the teeth 131 on the sleeves 123, will rotate the pump plungers 110 so as to vary the point at which the recess 117 will establish communication with the port 121 and in this way vary the point at which the fuel under pressure above the pump plunger 110 is vented to the supply through port 121, thus varying the amount of fuel supplied in accordance with the requirements of the engine.

Figure 6:
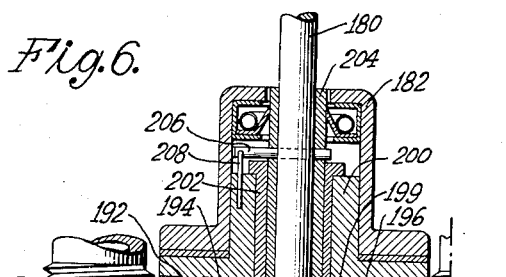
Figs. 6 and 7 are partial views similar to Fig. 1 of further modifications.

In the modification shown in Fig. 6 there is provided a plurality of chambers in which the pump plungers 10b are mounted for reciprocation by the cam 14 as in the modification shown in Fig. 1. To the flanged extension 18 of the pump drive shaft 20 a nut 160 secures the impeller housing 162 of a speed responsive device, such as is shown in my U. S. Patent No. 1,818,825, issued August 11, 1931.

In the axial bore 5 of the casing portion 1 there is mounted a valve body 36b having an annular passage 164 in communication with the source of fuel supply and passages 165 and 166 which communicate with the bores of the sleeves 12b in which the pump plungers are mounted and with an axial bore in the valve body. In the axial bore in the valve body 36b is mounted a valve sleeve 168 having ports 170 adapted to establish communication between the passages 165 and 166. The structure of the valve sleeve and body is not claimed herein, the same being disclosed and claimed in my U. S. Patent No. 2,190,575, dated February 13, 1940. To the lower end of the valve 168 there is secured a spring housing 172 by means of a spring ring 174 and mounted within the housing 172 is a spiral spring 176 the outer turns of which have a sufficiently large free diameter that when sprung into the housing they become frictionally secured to the housing and are held thereby except upon abnormal strains. The inner end of the spring 176 is bent inwardly and engaged in a slot in a sleeve 178 fixed on a shaft 180 which extends through the valve sleeve 168 and a cap 182 secured to the casing portion 1 so that means may be applied to the upper end thereof for rotating and holding the shaft 180 in adjusted position. The housing 172 projects below the spring 176 and at opposite points thereon lips or fingers 172a are pressed inwardly from the wall of the housing 172 forming shoulders which retain the spring 176 in the housing 172 and abutments which are engaged by a flat spring 184 mounted in a slot in the upper end of the stator shaft 186 of the speed responsive means. A pin 190 or other abutment projecting inwardly through the casing portion 1 is positioned to engage in the slot formed by pressing in the fingers or lips 172a and such pin may have an eccentric head and be rotatably mounted in the casing portion 1 so as adjustably to limit the movement of the spring housing in either or both directions.

The spring housing 172 bears against the valve body 36b and prevents movement of the valve sleeve 168 upwardly, and a washer 192 held in position by a spring ring 194 prevents movement of the valve in the opposite direction so that the ports 170 are maintained properly positioned with respect to the ports 165 and 166. Above the washer 192 there are provided flat springs 196 which engage in grooves in the valve sleeve 168 and in grooves in a ring 198 fixed in the bore in the housing, which springs may be arranged either to aid or oppose the action of the spiral spring 176. A spring ring 199 secures the flat springs 196 in position. Closing the bore 5 of the housing portion 1 is a cover member 200 in which there is pressed a bushing 202, the bushing 202 serving as a seat for a sleeve 204 fixed to the rod 180 by a pin 206. The pin 206 projects beyond the sleeve 204 and is engaged by pins 208 fixed in the cover member 200 to limit the turning movement of the rod 180. The cap 182 secured by suitable bolts, not shown, to the housing portion 1 serves to hold the cover portion 200 in position, suitable packing and gaskets being provided between the various parts to prevent leakage therefrom.

As in the case of the device of my U. S. Patent No. 1,818,825, referred to above, operation of the device by the operation of the engine causes the stator to tend to rotate against the action of the spring 176, the tendency varying with the speed of rotation of the engine, and carrying with it the valve 168 so as to close to a greater or less extent communication between the ports 166 and 165, thereby restricting to a greater or less extent the flow of fuel from the annular recess 164 through the ports 165, 170 and 166, to the chambers above the pump plungers, thus governing the amount of fuel supplied to the chambers in accordance with the requirements of the engine. While the type of speed responsive means shown in Fig. 6 is illustrated in connection with a valve operating as does the valve shown in Fig. 1, it is to be understood that it is not limited to such an arrangement but may be used in other arrangements such as are shown in Figs. 5 and 7.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a fuel control system for a Diesel engine or the like which has nozzles for injecting fuel into the engine cylinders, the combination with a pump provided with plungers for forcing fuel cyclically to said nozzles, said pump having a casing provided with an axial bore and a plurality of circumferentially disposed plunger bores and with sets of passages establishing communication between said axial bore and said plunger bores whereby ingress and egress of fuel to the latter are afforded, of a valve member slidably disposed in the axial bore of such pump casing and provided with passage means controlling a selected set of fuel passages in the pump casing, said passage means being formed to balance any axial forces arising from the pressure of fuel passing therein, spring means for biasing said valve member in a desired position, a centrifugal governing unit disposed in said axial bore having its axis in line with said valve member and arranged to react against the pressure of said spring means for operating said valve member, and rotatable means associated with the pump casing provided with an engine driven shaft and mechanically coupled for actuating said governing unit.

2. In a fuel control system for a Diesel engine or the like which has nozzles for injecting fuel into the engine cylinders, the combination with a pump provided with plungers for forcing fuel cyclically to said nozzles, said pump having a casing provided with an axial bore and a plurality of circumferentially disposed plunger bores and with sets of passages establishing communication between said axial bore and said plunger bores whereby ingress and egress of fuel to the latter are afforded, of a valve member slidably disposed in the axial bore of such pump casing and provided with passage means controlling a selected set of fuel passages in the pump casing, said passage means meing formed to balance any axial forces arising from the pressure of fuel passing therein, a valve body fixedly disposed in said axial bore about said slidable valve member and provided with passages cooperating with fuel passages in the pump casing, spring means for biasing said valve member in a desired position, a centrifugal governing unit disposed in said axial bore having its axis in line with said valve member and arranged to react against the force resulting from pressure of said spring means for operating said valve member, means for adjusting said valve member relatively to said valve body and arranged to transmit the reaction of said governing unit to said valve member, and rotatable means associated with the pump casing provided with a shaft adapted to be driven by the engine and mechanically coupled for actuating said governing unit.

3. In a fuel control system for a Diesel engine or the like which has nozzles for injecting fuel into the engine cylinders, the combination with a pump provided with plungers for forcing fuel cyclically to said nozzles, said pump having a casing provided with an axial bore and a plurality of circumferentially disposed plunger bores and with sets of passages establishing communication between said axial bore and said plunger bores whereby ingress and egress of fuel to the latter are afforded, of a valve member slidably disposed in the axial bore of such pump casing and provided with passage means controlling a selected set of fuel passages in the pump casing, said passage means being formed to balance any axial forces arising from the pressure of fuel passing therein, a valve body fixedly disposed in said axial bore about said slidable valve member and provided with passages cooperating with fuel passages in the pump casing, spring means for biasing said valve member in a desired position, means for altering the tension of said spring means, a centrifugal governing unit disposed in said axial bore having its axis in line with said valve member and arranged to react against the force resulting from pressure of said spring means for operating said valve member, means for adjusting said valve member relatively to said valve body and arranged to transmit the reaction of said governing unit to said valve member, and rotatable means associated with the pump casing provided with a shaft adapted to be driven by the engine and mechanically coupled for actuating said governing unit.

WARNER T. TABB.